(12) United States Patent
Herglotz et al.

(10) Patent No.: US 8,928,477 B2
(45) Date of Patent: Jan. 6, 2015

(54) METHOD AND DEVICE FOR CONTACTLESS TRANSMISSION OF ELECTRIC ENERGY AND/OR ELECTRIC SIGNALS BETWEEN A WALL AND A WING FASTENED TO SAID WALL

(75) Inventors: Tibor Herglotz, Kreuzau (DE); Ingo Steinfeld, Langenfeld (DE); Wolfgang Staude, Waldeck (DE); Sascha Puppel, Erkelenz (DE)

(73) Assignees: Dr. Hahn GmbH & Co. KG, Moenchengladbach-Wickrath (DE); Staude Kunststofftechnik GmbH, Waldeck (DE)

( * ) Notice: Subject to any disclaimer, the term of this patent is extended or adjusted under 35 U.S.C. 154(b) by 0 days.

(21) Appl. No.: 13/823,747

(22) PCT Filed: Sep. 29, 2011

(86) PCT No.: PCT/EP2011/067011
§ 371 (c)(1),
(2), (4) Date: Mar. 15, 2013

(87) PCT Pub. No.: WO2012/045661
PCT Pub. Date: Apr. 12, 2012

(65) Prior Publication Data
US 2013/0181830 A1    Jul. 18, 2013

(30) Foreign Application Priority Data

Oct. 4, 2010   (DE) .......................... 10 2010 037 943
Oct. 4, 2010   (DE) .......................... 10 2010 037 944

(51) Int. Cl.
| | |
|---|---|
| G08B 1/08 | (2006.01) |
| H01F 38/14 | (2006.01) |
| E05D 11/00 | (2006.01) |
| H04B 5/00 | (2006.01) |
| E05D 5/14 | (2006.01) |
| E05D 7/00 | (2006.01) |
| E05D 3/02 | (2006.01) |

(52) U.S. Cl.
CPC ............ *H01F 38/14* (2013.01); *E05D 11/0081* (2013.01); *H04B 5/0025* (2013.01); *E05D 5/14* (2013.01); *E05D 7/0054* (2013.01); *E05D 2003/025* (2013.01)
USPC ................. 340/539.1; 340/539.21; 340/545.1

(58) Field of Classification Search
USPC ............ 340/539.1, 540, 582, 538.11, 538.14, 340/538.16, 539.21, 539.31, 541, 545.1, 340/545.3–545.9
See application file for complete search history.

(56) References Cited

U.S. PATENT DOCUMENTS 5,178,739 A * 1/1993 Barnes et al. ............ 204/192.12
5,548,218 A * 8/1996 Lu ................................ 324/318
(Continued)

FOREIGN PATENT DOCUMENTS

CN    2137364 Y    6/1993
DE    30 29 543 A1    2/1982
(Continued)

*Primary Examiner* — Daniel Previl
(74) *Attorney, Agent, or Firm* — Norman B. Thot

(57) ABSTRACT

A method for a contactless transmission of electric energy and/or an electric signal between a wall and a wing fastened to the wall includes providing a first coil fastened to the wall and a second coil fastened to the wing which are actively inductively connected to each other. A control signal is applied to the first coil within a control time interval to induce a first signal in the second coil, which is then detected. A second control signal is applied to the second coil within the control time interval to induce a second signal in the first coil, which is then detected. A fault signal is generated if the first or second control signal, or a part thereof, is not applied during the control time interval, or if the first or second signal, or a part thereof, is not detected during the control time interval.

17 Claims, 8 Drawing Sheets

(56) References Cited

U.S. PATENT DOCUMENTS

| | | | |
|---|---|---|---|
| 5,821,632 A | 10/1998 | Normann et al. | |
| 6,191,547 B1 * | 2/2001 | Fricke et al. | 318/547 |
| 6,212,052 B1 * | 4/2001 | Heuer et al. | 361/160 |
| 6,233,119 B1 * | 5/2001 | Burga et al. | 360/236.9 |
| 6,510,517 B1 | 1/2003 | Bruhnke et al. | |
| 7,166,972 B2 * | 1/2007 | Yamate | 315/371 |

FOREIGN PATENT DOCUMENTS

| | | |
|---|---|---|
| DE | 39 15 812 A1 | 11/1990 |
| DE | 41 12 064 A1 | 10/1991 |
| DE | 43 22 811 A1 | 2/1994 |
| DE | 93 02 652 U1 | 8/1994 |
| DE | 10 2004 017 341 A1 | 1/2005 |
| EP | 0 316 872 A2 | 5/1989 |
| EP | 0 451 445 A2 | 10/1991 |

* cited by examiner

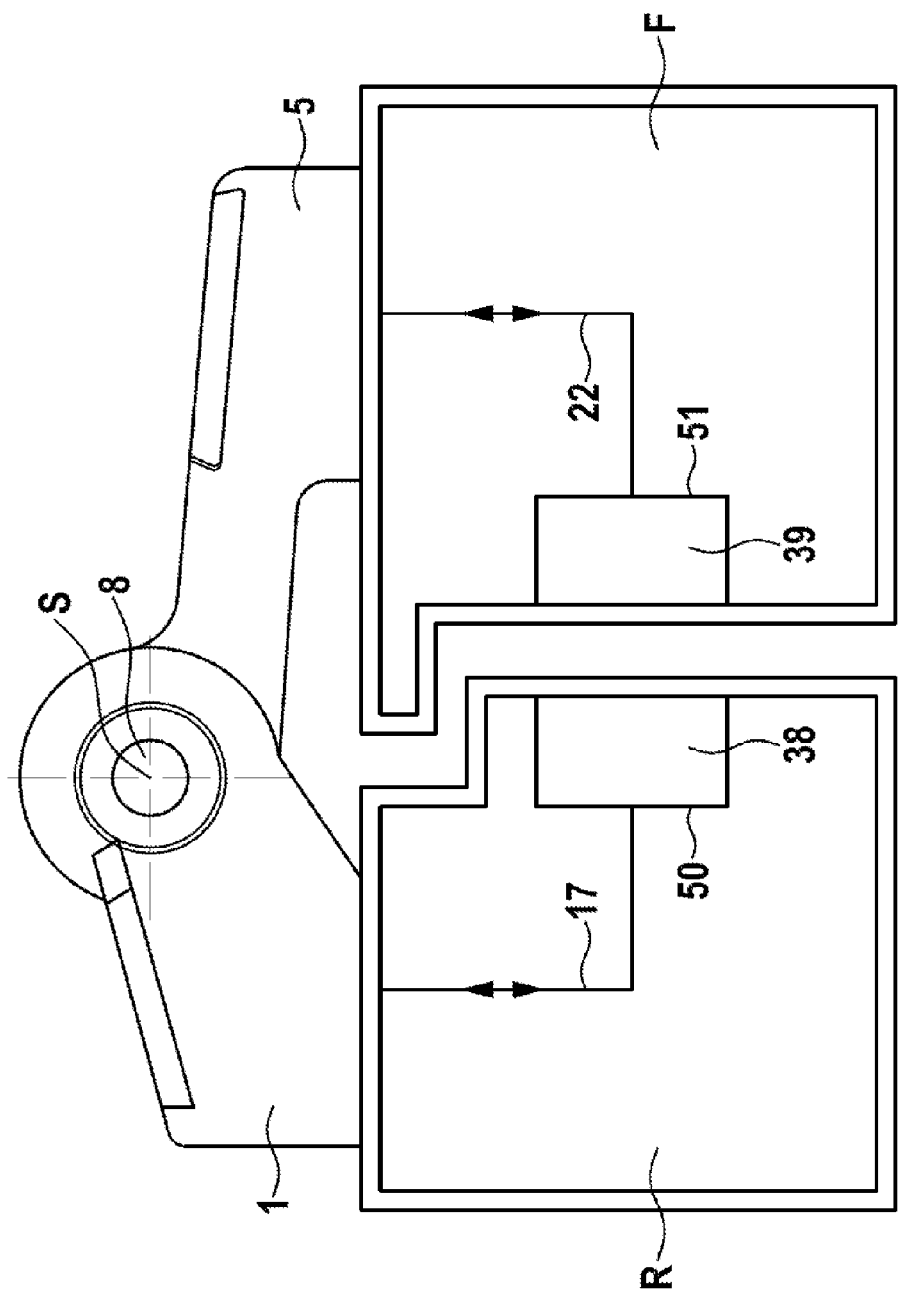

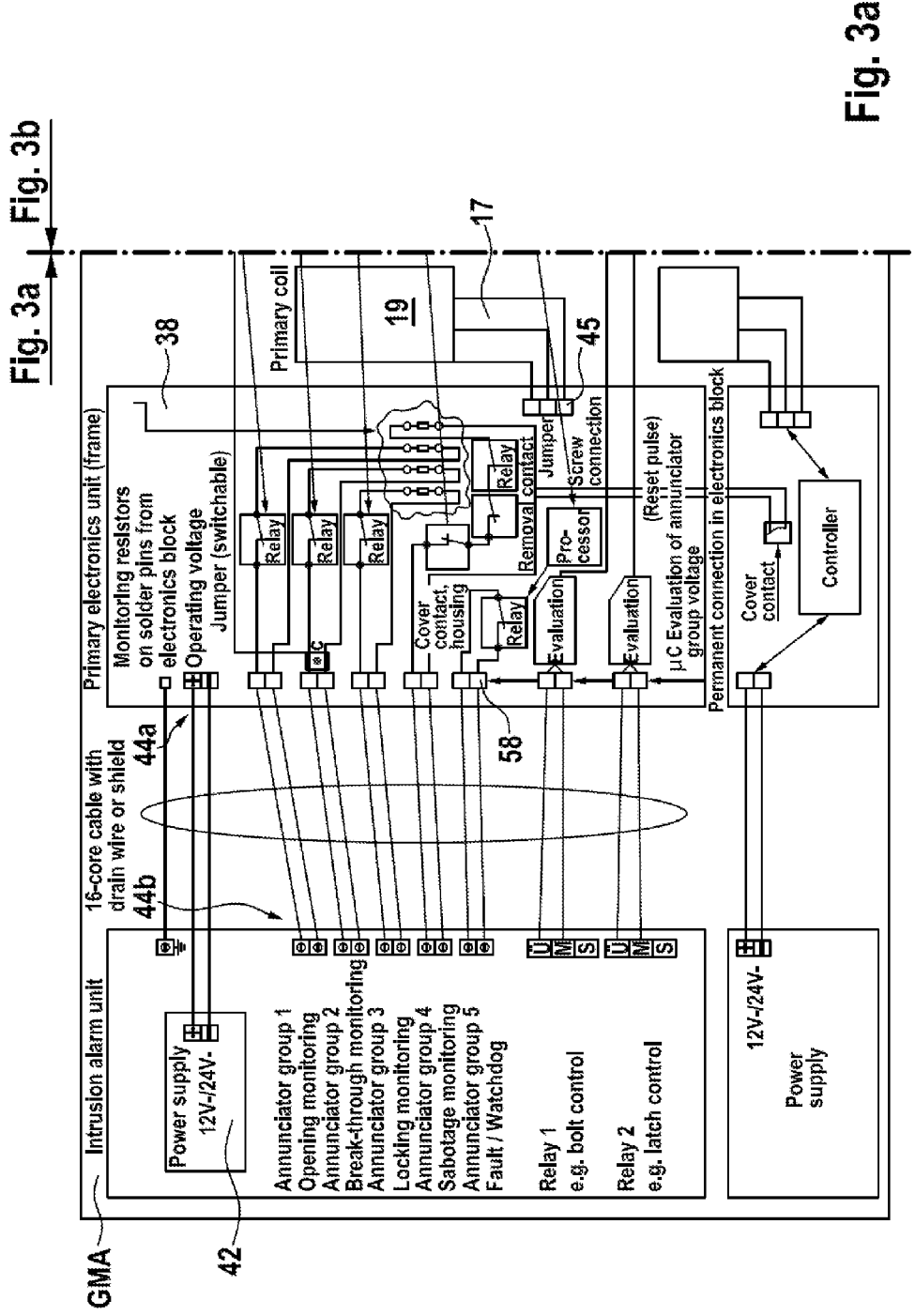

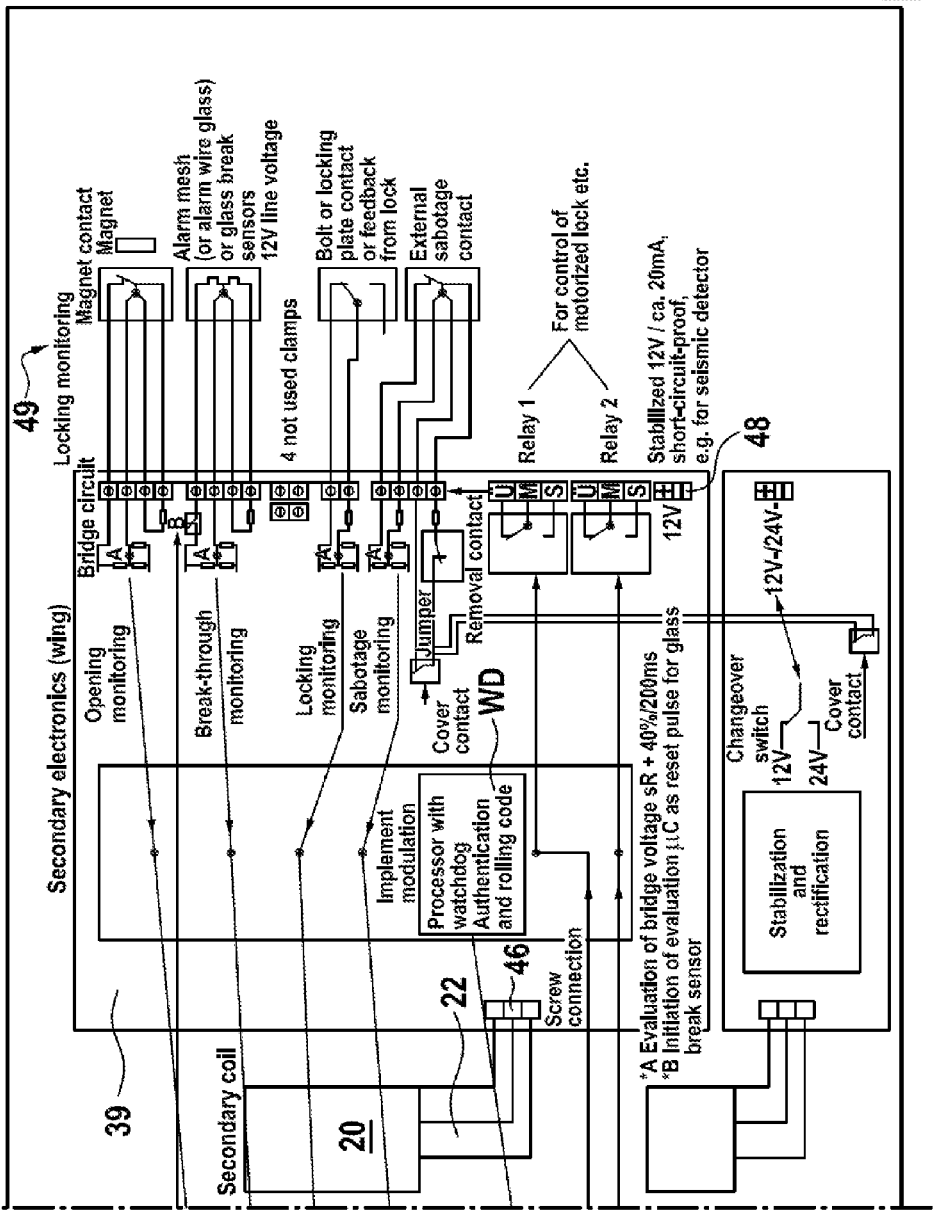

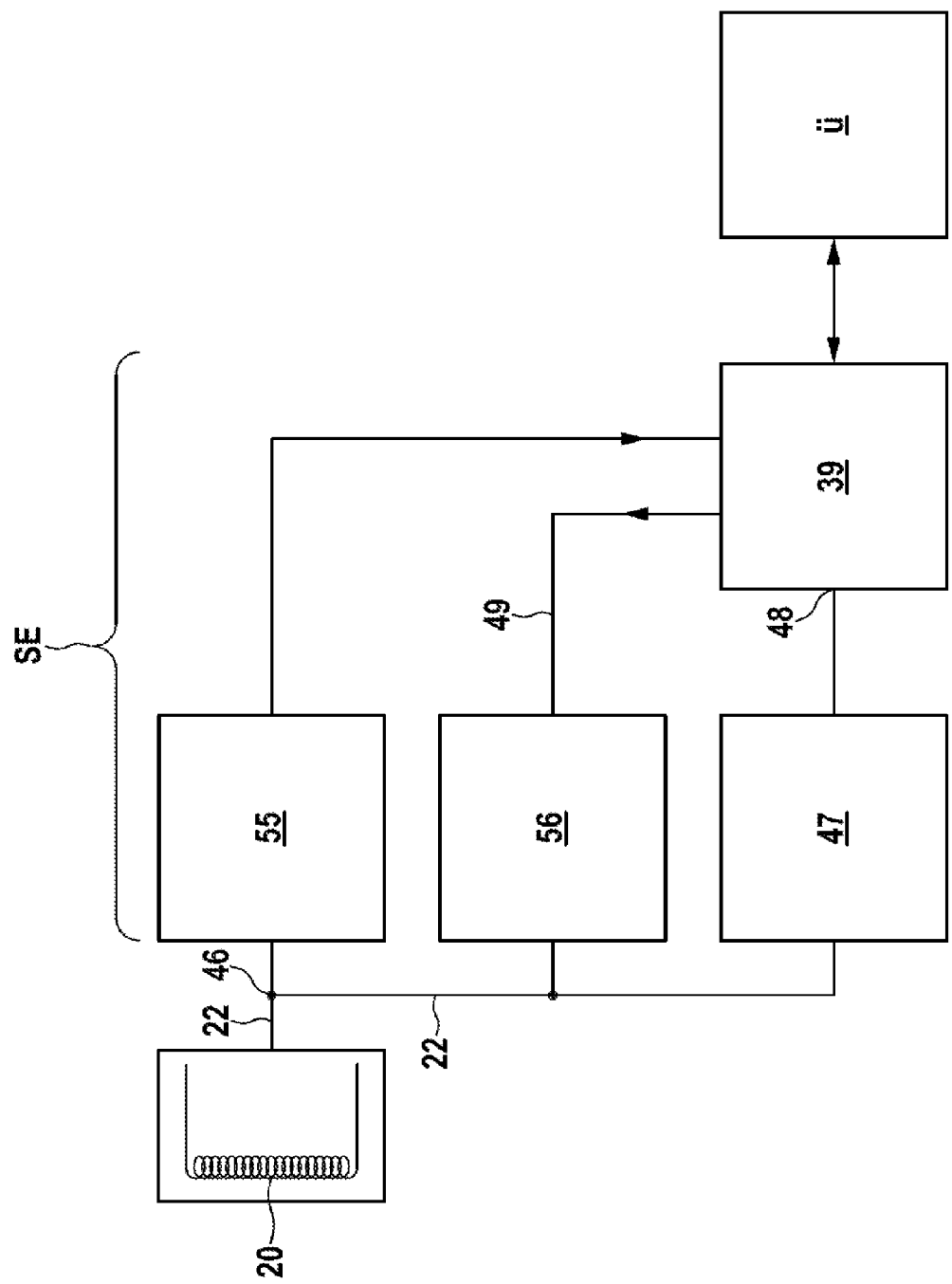

METHOD AND DEVICE FOR CONTACTLESS TRANSMISSION OF ELECTRIC ENERGY AND/OR ELECTRIC SIGNALS BETWEEN A WALL AND A WING FASTENED TO SAID WALL

CROSS REFERENCE TO PRIOR APPLICATIONS

This application is a U.S. National Phase application under 35 U.S.C. §371 of International Application No. PCT/EP2011/067011, filed on Sep. 29, 2011 and which claims benefit to German Patent Application No. 10 2010 037 943.3, filed on Oct. 4, 2010, and to German Patent Application No. 10 2010 037 944.1, filed on Oct. 4, 2010. The International Application was published in German on Apr. 12, 2012 as WO 2012/045661 A1 and as WO 2012/045661 A8 under PCT Article 21(2).

FIELD

Wings of doors of buildings, such as, in particular, houses, businesses or production workshops, increasingly have devices for improving safety or convenience, the current operating state and actuation of which are monitored or actuated by means of monitoring or actuating devices arranged outside the door and which transmit changes in operating state or signals possibly received from sensors in the form of data to the monitoring or actuating devices.

BACKGROUND

An intrusion alarm unit installed in a building which communicates with devices provided on the door, such as opening, break-through, locking, sabotage or motorized lock monitoring, is mentioned here by way of example Cables, which are flexibly laid between the wing and the frame and are frequently enclosed by a flexible metal tube for protection, are used in the prior art to transmit appropriate changes in state or data between the monitoring device and the devices located on the door.

These cable transitions detract considerably from the visual appearance and may become trapped when the wing is closed, which can lead to damage or even destruction of the cables. The cable transitions also constitute weak points with regard to possible tampering, on account of which a so-called Z-wiring of sensors or contacts is also effected in the cable transition to protect against sabotage.

A hinge with an integral transformer for contactless energy transmission is described in DE 10 2004 017 341 A1. This hinge comprises a primary coil arranged in a frame hinge part and a secondary coil arranged in a wing hinge part. The magnetic coupling of the secondary coil to the primary coil, which are spaced apart from one another in the direction of the articulation axis, is achieved by an iron core which passes through both coils and at the same time forms the hinge pin.

Although a contactless transmission of electric energy and/or electric signals between a wall and a wing fastened to said wall is, in principle, possible with this arrangement, a continuous design of this Z-wiring is not possible with this inductive energy and/or signal transmission, which is to the detriment of sabotage protection.

DE 43 22 811 A1 describes a device with which bidirectional data can be transmitted between door modules arranged in vehicle doors and a central control unit arranged in the vehicle outside the doors by means of transformer coupling. Sabotage protection is not, however, provided with this device.

SUMMARY

An aspect of the present invention is to provide an improved method with regard to sabotage protection and, for carrying out this method, a device for the contactless transmission of electric energy and/or of electric signals between a wall and a wing fastened to said wall, with which a first coil fastened to the wall and a second coil fastened to the wing, which coils are actively inductively connected to one another, are provided.

In an embodiment, the present invention provides a method for a contactless transmission of at least one of an electric energy and an electric signal between a wall and a wing fastened to the wall which includes providing a first coil fastened to the wall and providing a second coil fastened to the wing. The first coil and the second coil are actively inductively connected to each other. At least one first control signal is applied to the first coil within a recurring control time interval so as to induce at least one first signal in the second coil. The at least one first signal induced in the second coil is detected. At least one second control signal is applied to the second coil within the recurring control time interval so as to induce at least one second signal in the first coil. The at least one second signal induced in the first coil is detected. A first fault signal is generated if the at least one first control signal or the at least one second control signal, or a predetermined part thereof, expected during the recurring control time interval is not applied, or if the at least one first signal or the at least one second signal, or a predetermined part thereof, expected during the recurring control time interval is not detected.

In an embodiment, the present invention also provides a device for carrying out the aforementioned method which includes a first coil, a second coil, a primary electronics unit connected to the first coil. The primary electronics unit comprises a device which is configured to generate and to detect a control signal and a response control signal. A secondary electronics unit is connected to the second coil. The secondary electronics unit comprises a device which is configured to generate and to detect a control signal and a response control signal. The first coil and the second coil are configured so as to be actively inductively connected to each other.

BRIEF DESCRIPTION OF THE DRAWINGS

The present invention is described in greater detail below on the basis of embodiments and of the drawings in which:

FIG. 2 schematically shows the arrangement according to FIG. 1 in a state where it is attached to a frame and a wing profile which is hinged to the frame about an articulation axis;

FIG. 3 shows a single-line diagram of the device;

FIG. 5 shows a block circuit diagram of the secondary electronics unit of the device on the wing side;

DETAILED DESCRIPTION

Figure 1:
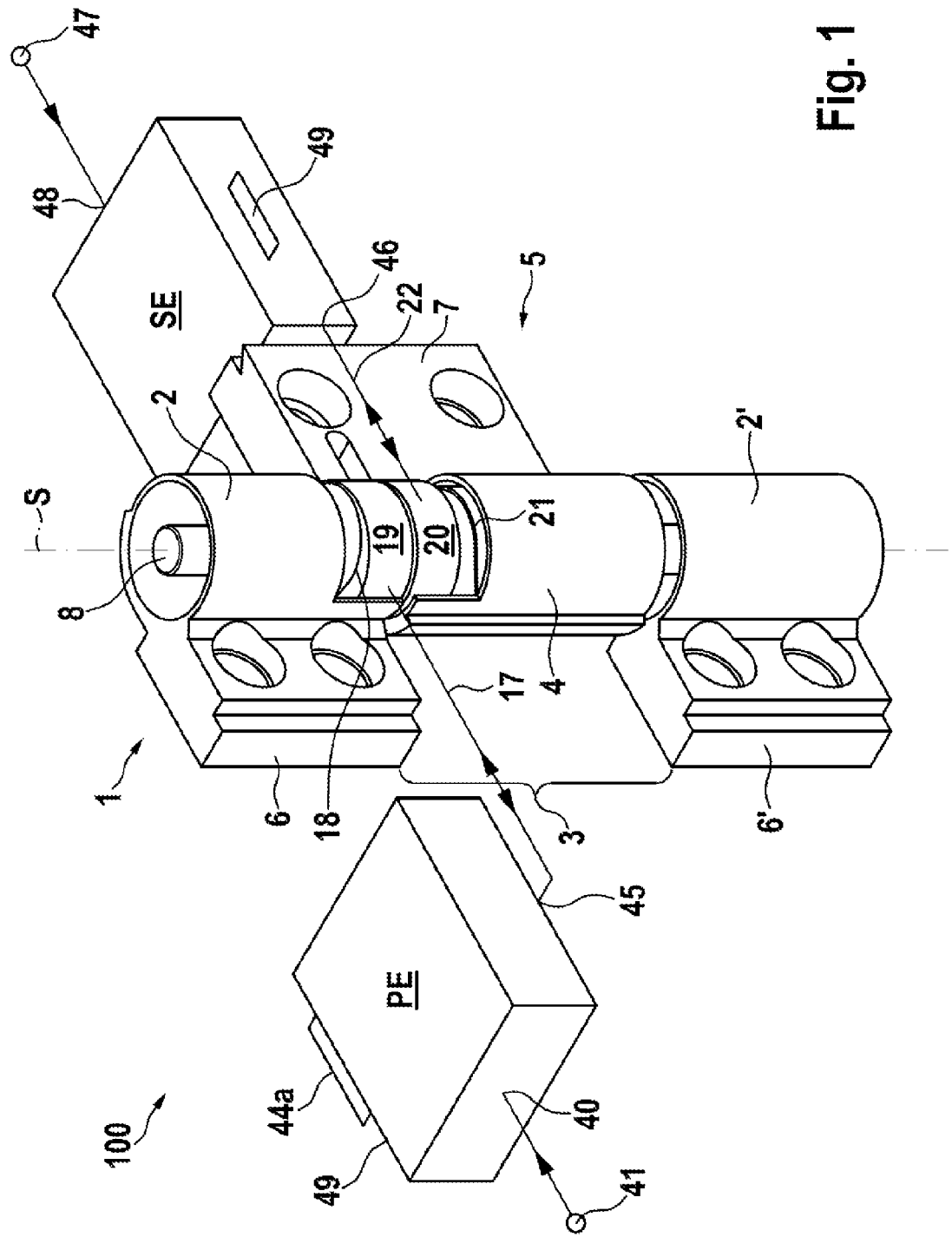
FIG. 1 schematically shows a device according to the present invention in a partially exploded diagram of the hinge and wing parts in a perspective view with schematically shown primary and secondary electronics units.

With the method according to the present invention, at least one first control signal is applied to the first coil within a recurring control time interval, and the at least one first signal thereupon induced in the second coil is detected. At least one response control signal is further applied to the second coil in this control time interval and the at least one signal thereupon induced in the first coil is likewise detected. If at least part of the expected control signals or induced signals is not applied to a coil in this bidirectional signal transmission in the control time interval, then a fault signal is generated. If this is transmitted to an annunciator group, for example, an intrusion alarm unit for initiating an alarm, then protection against sabotage is significantly improved by the method according to the present invention. The fault signal can also be sent to a so-called "watchdog" in order to prevent a false alarm from being initiated in the event of a technical fault.

Tests have shown that signal interference can occur in individual cases with the bidirectional transmission and detection of the control signals and the induced signals. In order to prevent such a fault initiating an alarm every time, an embodiment of the method according to the present invention provides two control signals which can in each case be applied to the first and the second coil within one control time interval. The fault signal is only generated if both control signals are not applied or not detected in the first and/or the second coil.

In an embodiment of the method according to the present invention, a response control signal can, for example, be applied to the second coil after generating the signal induced by the control signal, which in turn generates an induced signal in the first coil.

The recurring control interval, in which signals which are correlated with one another are generated or detected, can, for example, be between 100 ms and 500 ms, for example, approximately 200 ms.

Two successive control signals can, for example, be generated within a first time interval of 70 ms to 350 ms, for example, approximately 140 ms.

A control signal and an associated response control signal can, for example, be generated within a second period of 20 ms to 100 ms, for example, approximately 40 ms.

The control signal can in principle be of any kind which enables a signal to be generated in the other coil in each case in an inductive manner. The control signal and, for example, also the response control signal, can, for example, be generated by modulating a carrier voltage. All known methods for modulating signals come into consideration for this purpose. The carrier voltage for generating the control signal can, for example, be amplitude-modulated, and the carrier voltage for generating the response control signal can, for example, be frequency-modulated for the purposes of bidirectional transmission.

In an embodiment of the present invention, the carrier voltage can, for example, have a carrier frequency of at least 20 kHz, for example, between approximately 30 kHz and 200 kHz. The carrier frequency can, for example, be approximately 40 kHz.

Although the method described above significantly increases protection against sabotage, in order to additionally increase protection against extensive sabotage, an improvement of the method according to the present invention provides for the interrogation of the value of a control resistance simulated on the wing side during the time interval. If the transmitted value deviates, for example, by 40% from the stored reference value, this is then evaluated as an indication of an attempt at sabotage. The result of the comparison is transmitted within the control time interval.

In order to further increase security, the control and response control signal packets are encrypted with the help of a rolling code which can be decrypted by the respective receiving side.

To further increase security against sabotage, the method according to the present invention can include the method step of mutual authentication of a primary electronics unit electrically connected to the first coil and a secondary electronics unit connected to the second coil.

The device according to the present invention for carrying out the method according to the present invention described above comprises a primary coil provided on a wall, a secondary coil provided on a wing, wherein the primary and secondary coils are actively inductively connected to one another, a primary electronics unit connected to the primary coil, and a secondary electronics unit connected to the secondary coil, wherein the primary and secondary electronics units include means for generating and detecting control signals and response control signals.

In an embodiment of the present invention, the primary and secondary electronics units can, for example, include means for modulating a carrier voltage with the control signals. In the case of bidirectional data transmission, for example, a frequency modulator can be provided on the primary side and an amplitude modulator on the secondary side.

In an embodiment of the present invention, means for authenticating the primary and secondary electronics units can also be provided.

In order that the primary and the secondary electronics circuits cannot be accessed without damage when the wing is closed, the primary and secondary electronics circuits each comprise a housing which is suitable for fitting into a frame profile or into a wing profile, in particular, into profile recesses on the sides which face one another when the wing is closed.

In order to avoid interference to the primary or the secondary electronics circuits due to external electric magnetic fields while preventing an emission of electromagnetic radiation from the housings, these can be shielded. The housing can also be provided with covers and/or removal sensors which generate an alarm signal if an attempt at opening or removal is made.

In order to prevent overheating of the electronic components provided in the housings, which components themselves regularly develop a certain amount of heat, the housings can, for example, be made of a heat-conducting material, for example, of a heat-conducting plastic material, in order to simplify manufacture.

The primary and secondary electronics circuits can also include modems for 8-bit encryption and decryption of signals and control signals to be transmitted. The transmission rate can, for example, be 9600 baud. Analog signals transmitted from devices and sensors which are provided on the wing, for example, can also be modulated and transmitted in a manner insensitive to interference with the help of these modems. The primary and secondary electronics circuits can in each case include a bus system to which a plurality of sensors can in each case be connected. The measured values or state information provided with the help of the sensors can then be transmitted serially after modulation and demodulation, for example, using protocols which can comply with the RS 485 standard, for example.

The present invention is hereafter explained with reference to the exemplary embodiment shown in the drawing.

The device designated in the drawing as a whole by 100 visually replicates a so-called three-part hinge. If required, it can at the same time be assigned an articulation function and therefore replace a conventional hinge. Alternatively, it is used merely for the contactless transmission of electric energy and/or electric signals and is provided in addition to conventional hinges on a wing/hinge arrangement.

The device 100 comprises a hinge part 1, which is used for fastening to a fixed wing frame R. It has two articulating parts 2, 2' which are spaced apart from one another in the longitudinal direction of an articulation axis S by a gap 3.

A wing part 5, which in the exemplary embodiment shown in the drawing is attached to wing frame F, is arranged in the gap 3 between the top articulating part 2 and the bottom articulating part 2'. The hinge part 1 includes hinge fastening parts 6, 6', the wing part 5 and a wing fastening part 7 for fastening purposes.

The articulation axis S is defined by a hinge pin 8 which passes through the articulating parts 2, 2' and 4 and which passes in a known manner through the articulating parts in hinge pin mountings, which are not shown in the drawing for clarity.

A primary coil 19, which is acted upon by a helical spring 18 with a downward-acting spring force according to FIG. 1, is provided in the top articulating part 2 of the hinge part 1. The primary coil 19 is connected to a primary electronics unit PE with the help of a two-core, for example, shielded, electric cable 17.

A secondary coil 20, which is acted upon by an upward-acting spring force according to FIG. 1 with the help of a helical spring 21, is fitted into the articulating part 4 of the wing part 5. The first and second coils rest against one another under the effect of the helical springs 18, 21.

The secondary coil 20 is connected to a secondary electronics unit SE by means of an at least a two-core, for example, shielded, cable 22.

Figure 4:
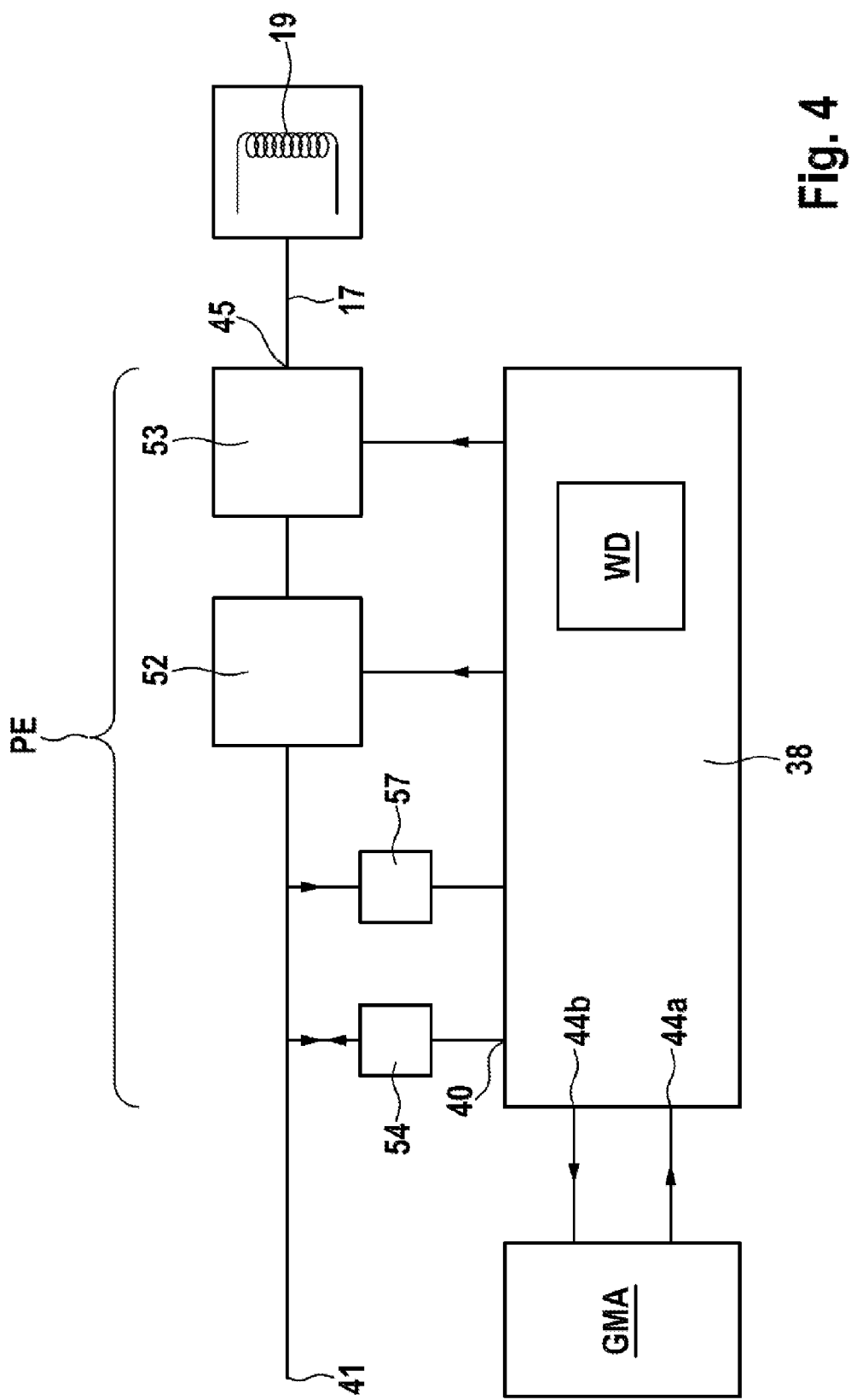
FIG. 4 shows a block circuit diagram of the primary electronics unit of the device on the frame side.

The primary electronics unit PE (FIG. 4) has a primary processor 38 with an input 40 which is used for connecting to an energy supply source 41 via a switching regulator 54 which converts the voltage provided by the energy supply source into the operating voltage of the primary processor. As can be seen in FIG. 3, this can be an emergency-power-buffered output of a power supply 42 of a hazard alert system GMA. It provides a DC supply voltage of 13.8 V, for example. The primary electronics unit PE comprises an inverter 52 which converts the DC input voltage into an alternating voltage, for example, of 12 V and a carrier frequency of 40 kHz, which is suitable for applying to the primary coil 19.

The primary processor 38 has connections 44a, 44b, to which signals from opening, break-through, locking and sabotage monitoring devices, for example, as well as control signals of an annunciator group MG, for example a hazard alert system GMA, are applied, for example, for actuating a bolt. These control signals are converted into serial data records by the primary electronics unit PE with the help of a bus system using, for example, protocols which comply with the RS 485 standard.

The primary processor 38 also includes a watchdog WD, which monitors the functions of the primary and secondary electronics units as well as the components and systems connected thereto. If a malfunction is detected, this is signaled as such to the hazard alert system GMA via an output 58 of the primary processor 38 in order to prevent a false alarm being initiated when the malfunction occurs. The watchdog can further initiate program instructions of the primary processor 38 in order to rectify the problem.

The primary electronics unit PE also includes a modulator 53, by means of which the carrier frequency is modulated by the data records to be transmitted. The modulated carrier voltage is present at a connection 45 and is fed to the primary coil 19 via the electric cable 17.

A secondary voltage is induced in the secondary coil 20 and fed to a connection 46 of the secondary electronics unit SE via the cable 22. It comprises a demodulator 55 which demodulates the secondary voltage modulated by the signals and transmits the signals to a secondary processor 39, for example, an opening, break-through, locking or sabotage monitoring device C. Sensors and devices for state interrogation and actuation are connected to the secondary processor via in/out cables.

The secondary processor 39 is connected to an energy supply source 47 which provides a 12 V direct voltage, for example, to an input 48.

Energy is therefore supplied to the secondary electronics unit SE by means of a supply voltage which is generated inductively in the secondary coil 20.

The secondary electronics unit SE in turn comprises a modulator 56 which converts signals provided by the sensors of the above-mentioned monitoring devices via connections 49 into serial signal packets in a manner corresponding to that of the primary electronics unit PE. The thus modulated carrier voltage is applied to the second coil 20 via the cable 22. The alternating voltage hereby induced in the primary coil 19 is fed to the primary electronics PE via the electric cable 17 and demodulated therein in a demodulator 57 as well as being fed to the hazard alert system GMA via connections 44b.

In order to generate a signal transmission which is as insensitive to interference and as low-loss as possible, the data to be transmitted from the primary side to the secondary side are frequency-modulated and the data to be transmitted from the secondary side to the primary side are amplitude-modulated.

The bidirectional data transmission thus created is carried out, for example, with an 8-bit resolution and a transmission rate of 9600 baud.

To increase the protection against sabotage, control signals KS are transmitted with a spacing of approximately 140 ms in a recurring time interval of approximately 200 ms to the primary electronics unit PE via the cables 22 and 17 and the secondary and primary coils 20 and 19. As, in the exemplary embodiment described, the control signals are applied to the secondary coils and the primary electronics unit acknowledges the receipt of the control signals by sending the response control signals RKS, the secondary coil 20 forms the first coil in the operating sequence and the primary coil 19 correspondingly the second coil. The control signals are linked to data packets which contain data and/or component state information which is to be transmitted to the primary electronics unit. The response control signals RKS correspondingly contain data packets which, for example, include control signals to these components. The primary electronics unit PE acknowledges the receipt of the control signal by re-transmitting a response control signal packet RKS to the secondary electronics unit SE within a 40 ms time interval. If the secondary electronics unit SE does not receive a response control signal RKS within this time interval, then a control signal packet KS is transmitted once more to the primary electronics unit after approximately 60 ms. If the primary electronics unit PE does not receive a response control signal packet RKS from the secondary electronics unit SE within the time interval of 200 ms, a fault signal is generated. The same applies if two successive control signal packets KS are faulty.

In order to further increase protection against sabotage, a control resistance on the wing side is simulated and interrogated by the secondary electronics unit SE and compared with a reference value stored in the secondary electronics unit. If the transmitted measured value deviates by, for example, 40% from the setpoint, then this is evaluated as an indication of an attempt at sabotage. The result of this comparison is transmitted to the primary electronics unit PE in this time interval.

In order to further increase security, the data and the control and response control signal packets are encrypted with the help of a rolling code which can be decrypted by the respective receiving primary electronics unit PE or secondary electronics unit SE.

Figures 6A, 6B:
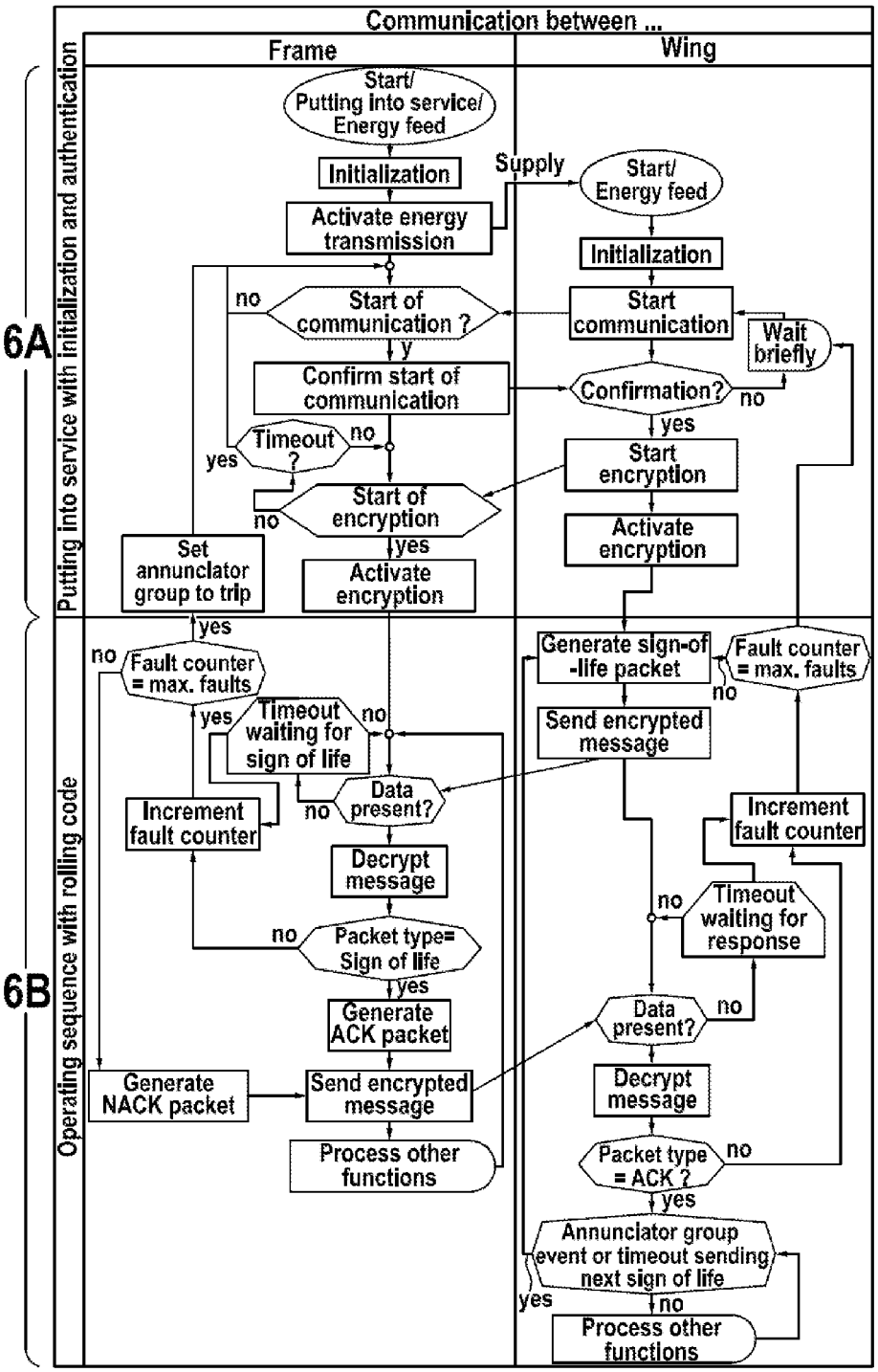
FIG. 6 schematically shows the sequence of the data transmission method.

The operating sequence, which is shown schematically in FIG. 6a) and b), is described more specifically below.

After putting into service on the frame side and activation of the rolling code encryption mode on both sides (FIG. 6a), the wing electronics unit begins to periodically transmit the data packet, also referred to as sign-of-life packet, which contains data and/or component state information, for example, of opening, break-through, locking and sabotage monitoring devices, in encoded form to the frame electronics unit with a spacing of a first time interval, which is approximately 140 ms. In this case, the wing electronics unit therefore constitutes the primary electronics unit, and the frame electronics unit the secondary electronics unit. The frame electronics unit waits for usable data and checks the arriving data packets. The decrypted data stream is checked for a sign of life from the wing electronics unit. The frame electronics unit transmits a positive acknowledgement (ACK packet) to the wing electronics unit for positive confirmation. This positive acknowledgement also contains the data and/or state information to be transmitted to the wing electronics unit for the reset pulse for the glass-break sensors and for the control and/or data outputs of the wing electronics unit.

The wing electronics unit waits for usable data and state information and checks the arriving data stream. The decrypted data stream is checked for a positive acknowledgement (ACK packet) from the frame electronics unit.

In the event of a change in state of components connected to the wing electronics unit, the periodic sequence described above is interrupted and the sign of life, which contains the component states in the wing electronics unit, is immediately re-transmitted encrypted with the rolling code. On evaluation of the sign of life, changes in state of the components in the wing electronics unit are detected in the frame electronics unit, and the control and/or data outputs, for example, annunciator group outputs of the hazard alert system GMA, are controlled accordingly.

In the event of a change in state of components on the frame side, for example, of an access control system, this information is detected in the frame electronics unit and transmitted to the wing electronics unit by the frame electronics unit on the next positive acknowledgement.

If a data packet should not be transmitted on the path from the wing electronics unit to the frame electronics unit within the control interval, then, after exceeding the first time interval, typically approximately 140 ms, from the last valid data packet received, a fault counter in the frame electronics unit is incremented, a negative acknowledgement (NACK packet) is transmitted to the wing electronics unit and, within a second defined time interval which is shorter than the first time interval and is typically 60 ms, a further data packet is transmitted from the wing electronics unit to the frame electronics unit. If this data packet is correctly received, confirmed by an ACK packet and evaluated by the frame electronics unit, then the fault counter is reset and no alarm is initiated. As the second signal was successfully transmitted within the specified control time interval, this is not evaluated as a fault. If the second sign of life which is immediately transmitted is not received correctly or not received at all, then the fault counter is incremented from 1 to 2 and is therefore detected as a fault. As a fault is now present and the control time interval has possibly been exceeded, all annunciator groups in the frame electronics unit are reset and an alarm is therefore initiated to the intruder alert system, for example.

If a data packet should change on the path from the wing electronics unit to the frame electronics unit, then this fault is detected by the frame electronics unit and the wing electronics unit with the help of a checksum and the decryption of the rolling code. The electronics unit which detects the fault increments the appropriate fault counter by 1. If the fault is detected in the frame electronics unit, then a data packet is transmitted from there with a negative acknowledgement (NACK packet). If the fault is detected in the wing electronics unit or if it receives a negative acknowledgement from the frame electronics unit, then the data packet is transmitted again within the second time interval. If this data packet is correctly received and evaluated by the frame electronics unit, then the fault counter is reset and no alarm is initiated. As the second signal was successfully transmitted within the control time interval, this is not evaluated as a fault. If the second data packet is not received correctly or not received at all, then the fault counter is incremented from 1 to 2 and therefore detected as a fault. As a fault is now present and the control time interval may have been exceeded, all control and/or data and outputs in the frame electronics unit are reset and an alarm is therefore initiated to the intruder alert system, for example.

Figure 7:
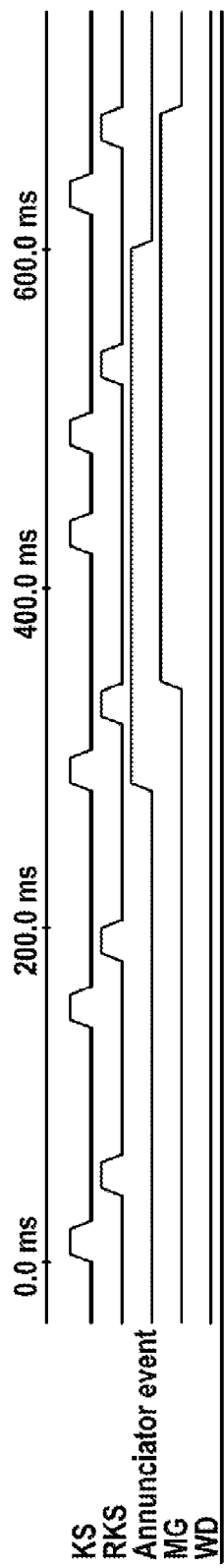
FIG. 7 shows the characteristics with respect to time and the time-dependence of control signals and response control signals which contain data and/or state information to be transmitted, and the associated states at the outputs of the annunciator group and of the watchdog for an example of an operating state.

The characteristics with respect to time and the time-dependence of control signals KS and response control signals RKS which contain data and/or state information to be transmitted, and the associated states at the outputs of the annunciator group MG and of the watchdog WD are shown in FIG. 7 in a first example of an operating state. With the help of the secondary electronics unit, control signals KS, which can contain data and/or state information, are applied to the secondary coil 20, i.e. the secondary coil on the wing side, with a spacing of approximately 140 ms. The voltage induced in the primary coil 19 on the frame side as a result of this signal is acknowledged by a response control signal RKS generated by the primary electronics unit PE with a spacing of about 40 ms. If, as is shown after the fourth control signal KS in FIG. 7, there is no response control signal RKS, a second control signal KS is applied to the secondary coil 20 after about 60 ms. In the case shown in FIG. 7, the receipt of the second control signal was acknowledged by a response control signal RKS on the frame side. An alarm was not initiated, as the transmission of the second control signal KS has been acknowledged. In the signal sequence shown in FIG. 7, the third control signal KS contains change-in-state information of an annunciator group MG which has been transmitted with the third control signal.

Figure 8:
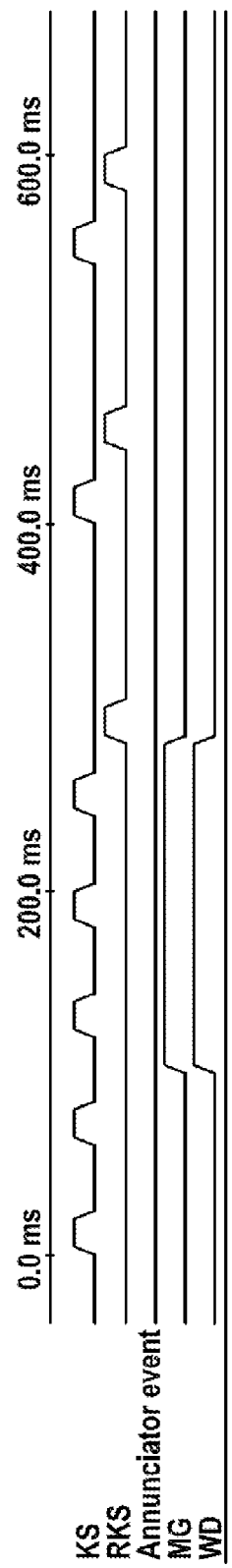
FIG. 8 shows a diagram of a second operating state corresponding to FIG. 7.

The operating state shown in FIG. 8 shows the behavior for a plurality of faulty transmissions. In this case, four successive control signals KS are not acknowledged by response control signals RKS. After the absence of at least the response control signal RKS expected after the second control signal KS, both the annunciator group output MG and the watchdog output WD are set to a fault state. The outputs are reset after the fifth control signal KS has been acknowledged by a response control signal RKS.

An appropriate signal is generated at connection 44a.

The primary electronics unit PE and the secondary electronics unit SE are accommodated in mechanically resistant housings 50, 51 with good thermal conductivity, which are merely shown schematically in FIG. 2.

The housing 50 of the primary electronics unit PE is fitted in a frame profile on the wall side and the housing 51 of the secondary electronics unit SE in a wing profile. Installation is carried out (as can be seen in FIG. 2) from the profile sides which face one another when the wing is closed. As a result of this measure, the housings 50, 51 are not visible from outside and can be protected against tampering by a sabotage contact which generates an alarm and/or fault signal if an attempt at removal is made.

In order to further increase the sabotage security, the primary electronics unit PE and the secondary electronics unit SE are nevertheless provided with means for mutual authentication so that an unnoticed replacement of a primary or secondary electronics unit PE, SE by a previously tampered-with electronics unit is at least made substantially more difficult.

To further increase the sabotage security, the electronics unit housings are provided with covers and/or removal sensors. If they should detect an opening and/or removal of the respective housing, this is evaluated as an attempt at sabotage and an appropriate signal is generated at output 44*a*.

The present invention is not limited to embodiments described herein; reference should be had to the appended claims.

LIST OF REFERENCES

100 Device
1 Hinge part
2, 2' Articulating parts
3 Gap
4 Articulating part
5 Wing part
6, 6' Hinge fasting parts
7 Wing fastening part
8 Hinge pin
17 Electric cable/conductor
18 Helical spring
19 Primary coil
20 Secondary coil
21 Helical spring
22 Electric cable/conductor
38 Primary processor
39 Secondary processor
40 Input
41 Energy supply source
42 Power supply
44*a*, 44*b* Connections
45 Connection
46 Connection
47 Energy supply source
48 Input
49 Connections
50 Housing
51 Housing
52 Inverter
53 Modulator
54 Switching regulator
55 Demodulator
56 Modulator
57 Demodulator
58 Output
F Wing frame
R Wing frame
S Articulation axis
PE Primary electronics unit
GMA Hazard alert system
SE Secondary electronics unit
MG Annunciator group
WD Watchdog
KS Control signals
RKS Response control signals
Ü Monitoring device

What is claimed is:

1. A method for a contactless transmission of at least one of an electric energy and an electric signal between a wall and a wing fastened to the wall, the method comprising:
providing a first coil fastened to the wall;
providing a second coil fastened to the wing, wherein the first coil and the second coil are actively inductively connected to each other;
applying at least one first control signal to the first coil within a recurring control time interval so as to induce at least one first signal in the second coil;
detecting the at least one first signal induced in the second coil;
applying at least one second control signal to the second coil within the recurring control time interval so as to induce at least one second signal in the first coil;
detecting the at least one second signal induced in the first coil; and
generating a first fault signal if the at least one first control signal or the at least one second control signal, or a part of the at least one first control signal or a part of the at least one second control signal, expected during the recurring control time interval is not applied, or if the at least one first signal or the at least one second signal, or a part of the at least one first control signal or a part of the at least one second control signal, expected during the recurring control time interval is not detected.

2. The method as recited in claim 1, wherein the method further comprises:
applying two first control signals to the first coil and two second control signals to the second coil within the recurring control time interval; and
generating the first fault signal if at least one of
both of the two first control signals and
both of the two second control signals
expected during the recurring control time interval are not applied, or if at least one of
both of two first signals induced in the second coil and
both of two second signals induced in the first coil
expected during the recurring control time interval are not detected.

3. The method as recited in claim 2, wherein,
after applying the at least one first control signal to the first coil, the method further comprises applying a response control signal to the first signal induced in the second coil to the second coil, or
after applying the at least one second control signal to the second coil, the method further comprises applying a response control signal to the second signal induced in the first coil to the first coil.

4. The method as recited in claim 3, wherein at least one of two successive first control signals and two successive second control signals, and two successive response control signals, are generated within a first control time interval of 70 ms to 350 ms.

5. The method as recited in claim 3, wherein at least one of the first control signal and the second control signal, and the response control signal, are generated within a second time interval of 20 ms to 100 ms.

6. The method as recited in claim 3, wherein the at least one first control signal, the at least one second control signal, and the response control signal are each encrypted.

7. The method as recited in claim 6, wherein the at least one first control signal, the at least one second control signal, and the response control signal are encrypted with a rolling code.

8. The method as recited in claim 1, wherein the recurring control time interval is between 100 ms and 500 ms.

9. The method as recited in claim 1, wherein the method further comprises:
   simulating a control resistance value on the wing side; and
   querying the control resistance value during the recurring control time interval.

10. The method as recited in claim 1, wherein the method further comprises
    providing a primary electronics unit electrically connected to the first coil;
    providing a secondary electronics unit electrically connected to the second coil; and
    mutually authenticating the primary electronics unit and the secondary electronics unit.

11. A device for carrying out the method as recited in claim 1, the device comprising:
    a first coil;
    a second coil;
    a primary electronics unit connected to the first coil, the primary electronics unit comprising a device which is configured to generate and to detect a control signal and a response control signal; and
    a secondary electronics unit connected to the second coil, the secondary electronics unit comprising a device which is configured to generate and to detect a control signal and a response control signal,
    wherein the first coil and the second coil are configured so as to be actively inductively connected to each other.

12. The device as recited in claim 11, wherein the primary electronics unit and the secondary electronics unit each further comprise a carrier voltage modulating device which is configured to modulate a carrier voltage with the control signal and with the response control signal.

13. The device as recited in claim 12, wherein the primary electronics unit further comprises a frequency carrier voltage modulating device which is configured to modulate a frequency of the carrier voltage with the control signal, and wherein the secondary electronics unit further comprises an amplitude carrier voltage device which is configured to modulate an amplitude of the carrier voltage with the response control signal.

14. The device as recited in claim 11, wherein the primary electronics unit and the secondary electronics unit each further comprise a housing which is at least partially made of a heat-conducting material.

15. The device as recited in claim 14, wherein the heat-conducting material is a heat-conducting plastic.

16. The device as recited in claim 11, wherein the primary electronics unit and the secondary electronics unit each further comprise a housing which is configured to fit into a frame profile or into a wing profile.

17. The device as recited in claim 16, wherein the housing is configured to fit into a profile recess(es) on sides which face one another when the wing is closed.

* * * * *